United States Patent [19]

Klein et al.

[11] 4,067,623
[45] Jan. 10, 1978

[54] PNEUMATIC PRESSURE CONVEYOR FOR FINE MATERIAL

[75] Inventors: Hans Klein; Carlos Arbeletche, both of Beckum; Gerhard Balzau; Manfred Steinman, both of Neubeckum, all of Germany

[73] Assignee: Polysius AG, Neubeckum, Germany

[21] Appl. No.: 701,287

[22] Filed: June 30, 1976

Related U.S. Application Data

[63] Continuation-in-part of Ser. No. 564,418, April 2, 1975, abandoned.

[30] Foreign Application Priority Data

Apr. 2, 1974   Germany .................... 7411476[U]

[51] Int. Cl.² .......................................... B65G 53/38
[52] U.S. Cl. ...................................... 302/53; 302/26; 366/106
[58] Field of Search .................... 302/26, 29, 31, 45, 302/47, 48, 51–54, 57; 222/195; 239/143; 259/DIG. 17

[56] References Cited

U.S. PATENT DOCUMENTS

| 2,631,759 | 3/1953 | Hoopes | 302/29 |
| 3,001,829 | 9/1961 | De Saint-Martin | 302/53 |
| 3,121,593 | 2/1964 | McIlvaine | 302/53 |
| 3,230,016 | 1/1966 | Gilbert et al. | 302/53 |
| 3,411,832 | 11/1968 | Garreau et al. | 302/53 |
| 3,822,919 | 7/1974 | Strom | 302/26 |

Primary Examiner—Johnny D. Cherry
Assistant Examiner—Jeffrey V. Nase
Attorney, Agent, or Firm—Marshall & Yeasting

[57] ABSTRACT

There are two superimposed pressure vessels, the upper of which has a closable material inlet connected to a source of fine material and has a lower end in the form of a cone with a bottom outlet. The lower pressure vessel has a material inlet which is connected through a valve to the bottom outlet of said cone, and has a pneumatic feed conduit connected to its lower portion as a material outlet. A conduit is connected to both vessels for equalizing the pressure therein after the inlet of the upper vessel has been closed and before said valve is opened. A plurality of nozzles are uniformly distributed throughout said cone and are connected to a source of gas under pressure for aerating material in said cone, each of said nozzles having an inside diameter between 0.2 and 0.6 mm.

3 Claims, 2 Drawing Figures

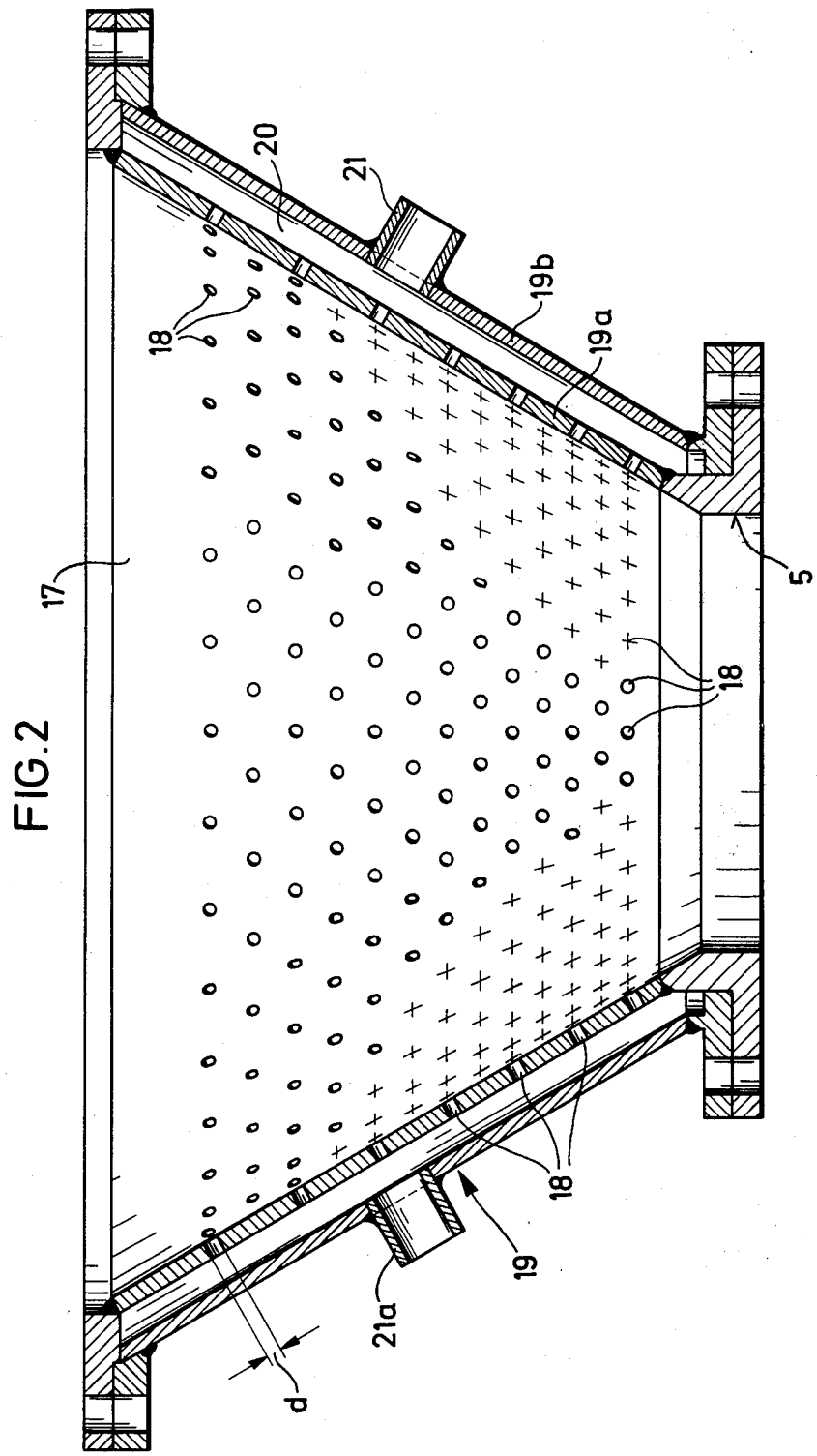

PNEUMATIC PRESSURE CONVEYOR FOR FINE MATERIAL

CROSS REFERENCE TO RELATED APPLICATION

This is a continuation-in-part of application Ser. No. 564,418 filed Apr. 2, 1975, and now abandoned.

BACKGROUND OF THE INVENTION

This invention relates to a pneumatic pressure conveyor for fine material, with two superimposed pressure vessels, wherein the closable material inlet aperture of the upper pressure vessel is connected to a feeder for the material and the lower section of the lower pressure vessel is connected to a pneumatic feed conduit, and wherein at least the upper pressure vessel has a material aerating cone pressurisable by gas, the outlet aperture of said cone being connected by a valve member to the inlet aperture of the other pressure vessel in such a manner that when the upper vessel is pressurized and the inlet aperture to the vessel is closed, the valve member is opened in order to fill the lower vessel, and wherein both pressure vessels are connected to pressure conduits or pressure equalising conduits.

Pneumatic pressure conveyors are very widely known which comprise only one pressure vessel and hence can only expel fine material from the pressure vessel discontinously, since the vessel must first be filled, then closed and finally pressurised so that the material can be pneumatically expelled from the pressure vessel.

In order to be able to convey with pneumatic pressure conveyors as continuously as possible, various constructions have therefore been provided (see for instance German DAS No. 1212871 and German OLS No. 1903539) wherein two pressure vessels are disposed one above the other in the manner initially described and joined together. With these constructions, while the fine material in the lower pressure vessel is being pneumatically extracted, with the outlet aperture closed and the inlet aperture opened in the upper pressure vessel, it is possible for further fine material to reach the pressure conveyor and be received in the upper pressure vessel. When the upper pressure vessel is sufficiently filled, its inlet aperture is then closed, the vessel is pressurised (so that approximately the same pressure prevails in both pressure vessels) and then its outlet aperture is opened, so that fresh material is supplied to the lower pressure vessel from which material can be continuously extracted.

The difficulty with this known device is that, at least in the upper pressure vessel, the fine material often tends to form bridges, which hinder or prevent the pneumatic conveyance. To alleviate this difficulty, the known pressure conveyors have been altered by providing at least the upper pressure vessel with a material-aerating cone pressurisable by gas, whose casing has portions that are porous, such as for instance ceramic plates, sintered metal plates and the like, through which the aerating gas (e.g. air) is fed into the container. This measure has ind ed proved satisfactory in ordinary mixing and storage silos, but cannot achieve satisfactory loosening of the material present in the pressure vessel, this being mainly due to the fine material undergoing marked compaction during the pressure equalisation.

SUMMARY OF THE INVENTION

The invention is therefore directed to the problem of providing a pneumatic pressure conveyor, of the type initially defined, which will permit reliable movement of the compressed fine material out of the upper pressure vessel and thus ensure continuous pneumatic conveyance.

According to the invention this problem is solved in that the material-aerating cone in the upper pressure vessel is provided with a number of nozzles, uniformly distributed over the length and periphery of the casing, and having an inside diameter of between about 0.2 and 0.6 mm. In the pneumatic pressure conveyor embodying the invention, when the fine material which has been heavily compacted due to the pressure equalisation between the two vessels is to be moved from the upper pressure vessel into the lower vessel, the nozzles in the aerating cone are pressurised with gas which can pass through said nozzles deeply into the fine material and hence cause effective loosening of the material, so that bridge building by the material can be prevented with great reliability. It has been found that penetration of the aerating gas into the fine material and hence the loosening of this material is influenced to an extremely favourable extend if the internal diameter of the nozzles is between about 0.2 and 0.6 mm.

In accordance with one form of the invention it is also desirable that the loosening air be blown into the upper pressure vessel in a pulsating manner by means of a control unit by which the duration of the inpulses and their frequency can be varied according to the feed properties of the fine material being conveyed. This embodiment is especially desirable for fine material which tends to form bridges very readily and has unfavourable feed properties.

The duration of the impulses of loosening air may be at least 0.2 second. The interval between impulses may be from 0.25 second to 30 seconds.

When the nozzles are pressurized to cause gas to pass through the nozzles deeply into the fine material, it is necessary that the absolute pressure at which the gas is supplied to the nozzles be at least 4 percent but not more than 89.3 percent greater than the absolute pressure in the pressure vessels. For example, if the pressure in the vessels is 6 bar, gas may be supplied to the nozzles at a pressure from 6.25 bar to 11.4 bar. If the pressure in the vessels is 30 bar, gas may be supplied to the nozzles at a pressure from 31.2 bar to 56.8 bar.

BRIEF DESCRIPTION OF THE DRAWINGS

FIG. 2 is a section through an aerating cone in accordance with the invention.

DESCRIPTION OF THE PREFERRED EMBODIMENT

Figure 1:
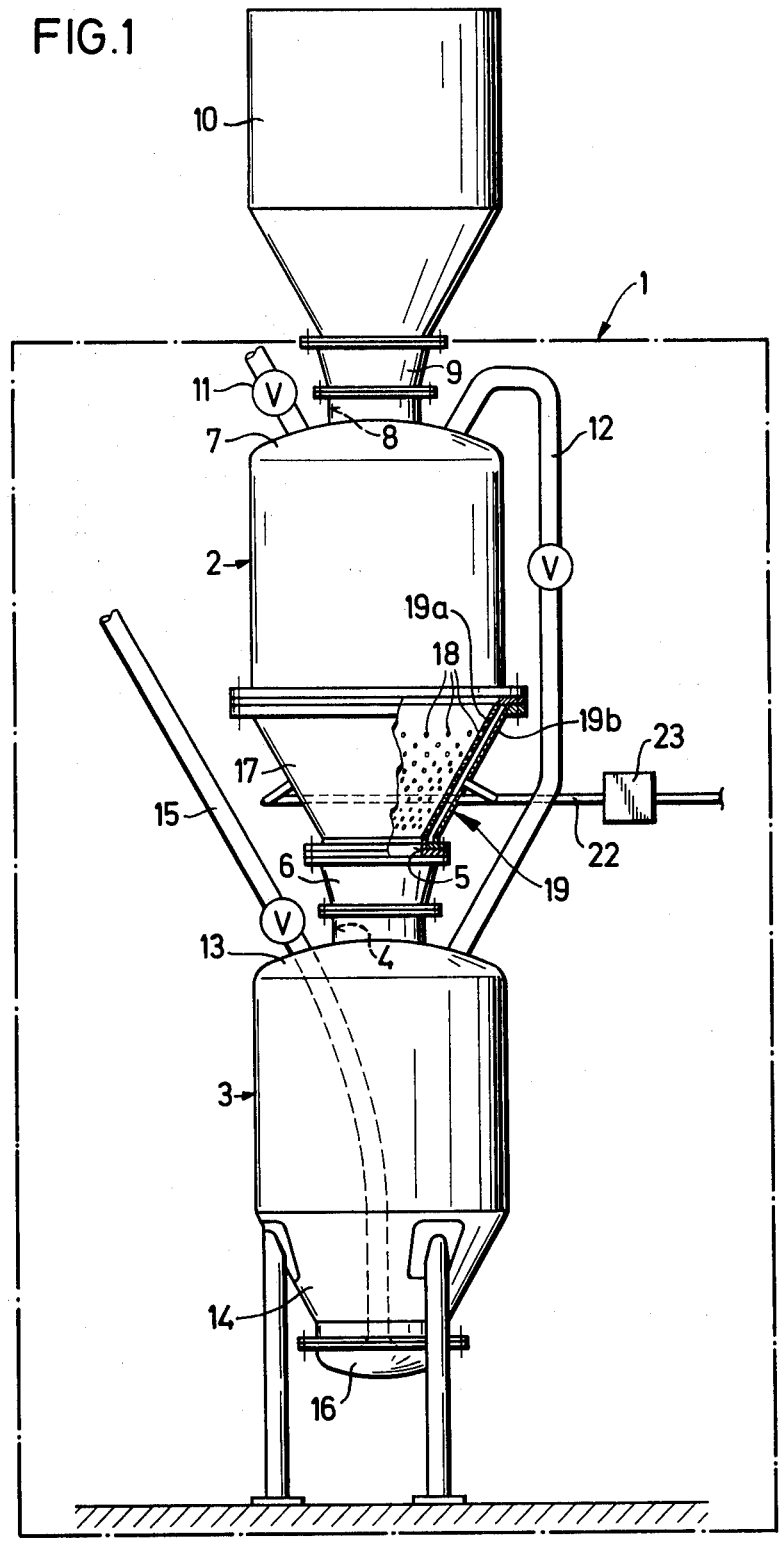
FIG. 1 is a general view of the pressure conveyor in accordance with the invention.

The pneumatic pressure conveyor 1 in accordance with the invention as shown in FIG. 1 includes an upper pressure vessel 2 with a lower pressure vessel 3 disposed below it, the inlet aperture 4 of the lower vessel being connected to the outlet aperture 5 of the upper pressure vessel, through a valve member 6. In usual fashion, both pressure vessels 2 and 3 have a generally cylindrical main portion, having at the top a domed cover, and connected at the bottom to a conical portion. The two pressure vessels 2 and 3 are coaxially disposed one above the other.

In the centre of the domed cover 7 of the upper pressure vessel 2 is an inlet aperture 8 at which is disposed a further valve member 9. Above this valve member 9 there can be connected either material feeding conduit or, as in the example shown, a storage container 10.

Connected to the cover 7 of the upper pressure vessel 2 there is also an air-discharge conduit with an air release valve 11, and also the one end of an equalisation conduit 12 whose other end is connected to the domed cover 13 of the lower pressure vessel 3.

Terminating in the cone 14 of the lower pressure vessel 3 is a pneumatic feed conduit 15 passing through said vessel from top to bottom, by which the fine material is extracted from the pressure conveyor 1. In the embodiment shown in FIG. 1 the cone 14 of the lower pressure vessel is closed at its bottom by a base 16 to which loosening air can be applied, said base being coated on its inner side for instance with porous material.

The bottom section of the lower pressure vessel 3 may naturally also be formed in such manner that the material to be conveyed runs downwards out of the cone 14, where it may be received by a horizontal pneumatic conveyor conduit.

In order to ensure that the fine material runs properly from the upper pressure vessel 2 into the lower pressure vessel 3, the lower exit cone of the upper pressure vessel is formed as an aerating cone 17. It is provided with a number of nozzles 18 which are uniformly distributed over the length and periphery of the cone casing (see FIG. 2). In the embodiment shown in FIG. 2 the casing 19 of the aerating cone 17 is made with a double-wall, i.e. it comprises two funnel walls 19a and 19b spaced from each other, which define between them a space 20 for the supply of loosening gas (e.g. air). This intermediate space 20 can be a single undivided space surrounding the inner funnel wall 19a. As may also be clearly seen from FIG. 2, the nozzles 18 are formed directly in the inner funnel wall 19a. The outer funnel wall 19b of the casing 19 is in this case provided with two connector stub pipes 21, 21a which are connected to a joint aerating gas feed conduit 22 (see FIG. 1).

For many applications it may also be advantageous to divide the space between the two funnel walls horizontally and/or vertically, thus producing a number of sub-divisions for feeding the aerating gas, in which case a separate stub pipe for connecting to the aerating gas feed conduit is provided for each sub-division. Each sub-division of the space can then be supplied with aerating gas separately, for example following a particular sequence.

While in the embodiments of the aerating cone described above the nozzles are formed directly in the inner funnel wall (e.g. 19a) of the double-walled casing, the casing of the aerating cone may instead comprise a single cone wherein the nozzles are individually set and then connected to an aerating gas feed conduit. In this case it is obviously also possible to dispose the nozzles in groups, so that when necessary aerating gas is blown into the pressure vessel only over specific sections of the casing. The same effect can obviously be achieved with an aerating cone having individually inserted nozzles as with the cone described with reference to FIG. 2; however, in general the form of construction in FIG. 2 represents the simpler design.

In forming the nozzles care should be taken in all cases that the internal diameter lies between 0.2 and 0.6mm. In the tests on which the invention is based, nozzles with an internal diameter between 0.3 and 0.45mm have proved particularly effective. The number and the diameter of the nozzles is preferably determined by the properties of the fine material to be conveyed. It has also been found that if the nozzles are effectively distributed over the cone casing, only a relatively small number of them are needed to achieve the desired loosening and the prevention of bridge formation.

As shown in FIG. 1, in the aerating gas feed conduit 22 there is disposed a control device 23 which controls the supply of loosening air to the aerating cone 17 and to its nozzles 18 in such a manner that aerating gas is blown pulsatingly through the nozzles 18 into the upper pressure vessel 2. The control device 23 is in addition so designed that the duration of the impulses and their frequency can be varied according to the feed properties of the fine material to be conveyed. With such a control device any sub-sections present in the double-walled cone casing, or the individual nozzles set in the cone casing (singly or in groups) can naturally be controlled correspondingly. Depending on the design and assembly of the pressure conveyor, the aerating gas can be derived from a different gas source. A very simple possibility, however, is to branch the aerating gas feed conduit from the conduit which is used to supply the conveying air. It is also possible to provide a separate blower for feeding aerating gas to the nozzles.

Finally it may also be mentioned that the bottom cone 14 of the lower pressure vessel can obviously also be formed in the manner described above as an aerating cone (with uniformly distributed nozzles.)

We claim:

1. A pneumatic pressure conveyor for fine material comprising two superimposed pressure vessels, the upper of which has a closable material inlet connected to a source of fine material and has a lower end in the form of a cone with a bottom outlet, the lower vessel having a material inlet connected through a valve to the bottom outlet of said cone, and having a pneumatic feed outlet conduit connected to its lower portion, and a valved conduit connected to both vessels for equalizing the pressure therein to pressurize the upper vessel after the inlet of the upper vessel has been closed and before said valve is opened, wherein the improvement comprises means for breaking up a heavily compacted mass of fine material which has been compressed into said cone during pressurization of the upper vessel, to cause the contents of the upper vessel to be dumped into the lower vessel upon opening of said valve, said means comprising:

a. a plurality of nozzles uniformly distributed over the length and periphery of said cone, which have an internal diameter between 0.2 and 0.6 mm.,
 b. said nozzles being connected to a source of gas under an absolute pressure at least 4 percent but not more than 89.3 percent greater than the absolute pressure in said vessels, to produce jets which penetrate deeply into the heavily compacted mass of fine material so as to break up bridges in the material,
 c. the interior of said cone being unobstructed, and
 d. control means for causing the gas to be supplied in pulsations at least 0.2 second in duration, with an interval of 0.25 to 30 seconds between pulses.

2. A pneumatic pressure conveyor according to claim 1 wherein the cone of the upper pressure vessel comprises two conical walls which are spaced apart to define a chamber for conducting gas under pressure, the nozzles being formed in the inner wall, and the outer wall having at least one inlet for gas under pressure.

3. A pneumatic pressure conveyor according to claim 1 wherein each of the nozzles has an internal diameter between 0.3 and 0.45 mm.

* * * * *